Feb. 6, 1945.  W. ERNST  2,368,754
RELIEF VALVE
Filed Feb. 13, 1943
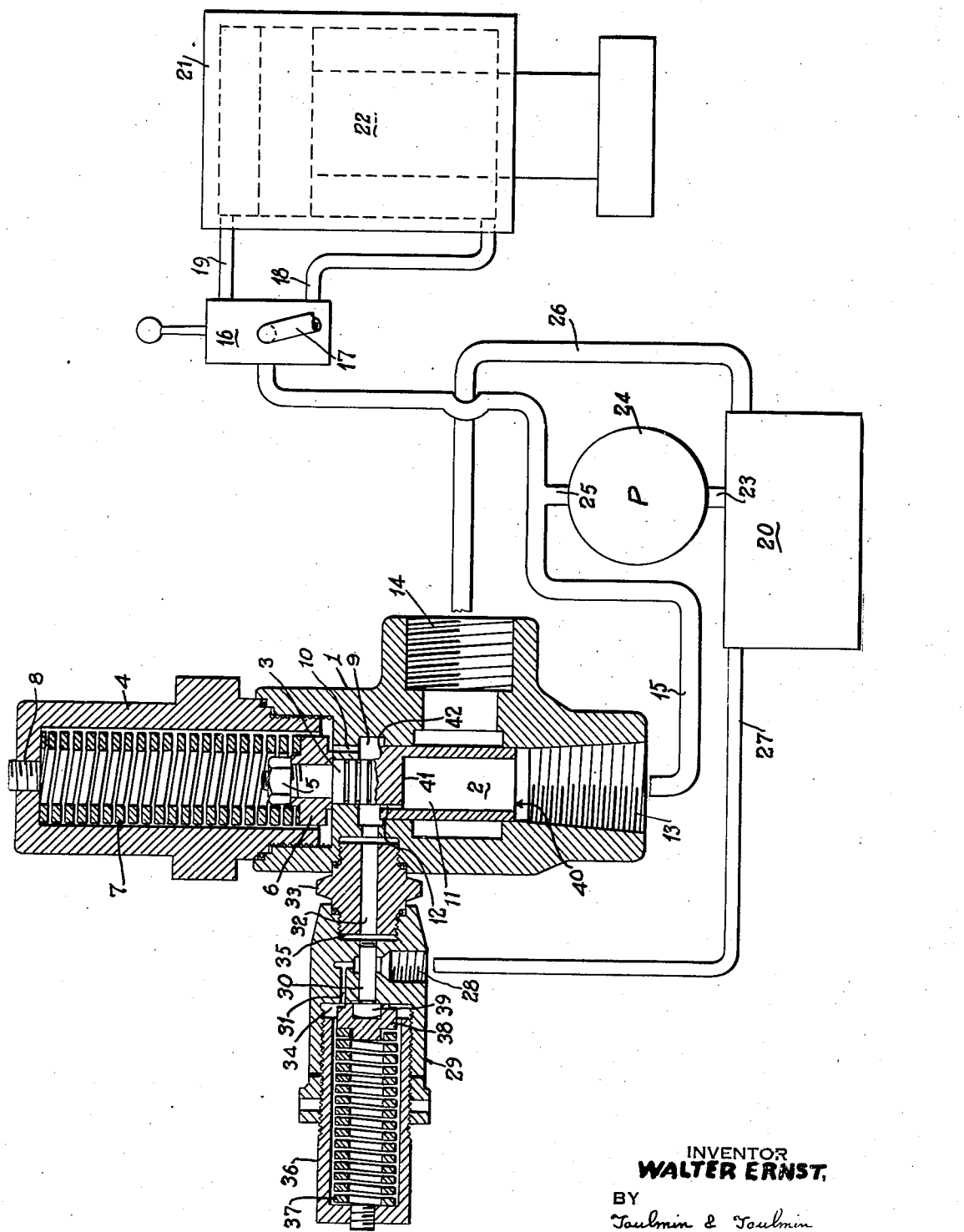
INVENTOR
WALTER ERNST,
BY
Toulmin & Toulmin
ATTORNEYS Patented Feb. 6, 1945

2,368,754

UNITED STATES PATENT OFFICE 2,368,754

RELIEF VALVE

Walter Ernst, Mount Gilead, Ohio, assignor to The Hydraulic Development Corporation, Inc., Wilmington, Del., a corporation of Delaware Application February 13, 1943, Serial No. 475,741

3 Claims. (Cl. 137—53)

This invention relates to valves and, in particular, to improvements in relief valves which, in response to a predetermined pressure acting thereupon, release an outlet opening to relieve pressure therethrough.

Most of the relief valves heretofore known have the drawback that, when using high pressures and correspondingly strong control springs, the valve member vibrates violently and frequently causes breakage of delicate gages connected thereto. Moreover, these known valves make it impossible to stabilize the desired opening or releasing pressure for the valve.

Accordingly, it is an object of this invention to provide a relief valve which will overcome the above mentioned drawbacks.

Another object of the invention consists in the provision of a relief valve having a fluid operable differential valve member for controlling the release of pressure fluid from an inlet port of the valve through an outlet port thereof, and being provided with a spring arranged in a spring chamber for urging the valve member into closing position, while restricted fluid connection is continuously established between said inlet port and said spring chamber.

It is another object of the invention to provide a relief valve having a valve member with a differential piston portion and being provided with a spring arranged in a spring chamber and urging the valve member into closing position, in which fluid pressure is conveyed from one area of said differential piston portion to an opposed area thereof for aiding said spring in its tendency to urge the valve member into closing position, while a restricted fluid connection is provided between said first mentioned area of the differential piston portion and said spring chamber.

A further object of the invention consists in the provision of a relief valve as set forth in the preceding paragraph, in which the smaller area of two opposed areas of the differential piston portion of the valve member is continuously hydraulically connected to an auxiliary relief valve arranged to open prior to the opening of the differential valve member.

It is a still further object of the invention to provide a relief valve having a differential valve member for controlling the fluid connection between an inlet port and an outlet port of said valve, in whch the valve member in its closed position is hydraulically balanced, while an auxiliary relief valve is hydraulically connected with said valve member and adapted to open at a predetermined pressure to thereby unbalance said valve member for causing the latter rapidly to move into position for establishing fluid connection between said inlet and outlet ports.

These and other objects and advantages of the invention will appear more clearly from the following specification in connection with the accompanying drawing which, by way of example, illustrates an embodiment of the invention in connection with a hydraulic circuit.

Referring now to the drawing in detail, the structure shown therein comprises a valve casing 1, in which is reciprocably mounted a plunger 2. The plunger 2 has an extension 3 extending into a spring chamber 4 which latter is connected to the valve casing 1 in any convenient manner. According to the drawing, the spring chamber 4 threadedly engages the valve casing 1.

Connected to the extension 3 by means of a nut 5 is a plate 6 on which rests the lower end of the spring 7. The upper end of this spring 7 engages the bottom of the spring chamber 4. Threaded into the upper portion of the spring chamber 4 is a plug 8, which tightly closes a corresponding opening in the spring chamber 4.

The extension 3 of the plunger 2, passes through a differential chamber 9 which is in fluid communication with the spring chamber 4 through a narrow passage-way 10. The plunger 2 is provided with a bore 11 which is in fluid communication with the differential chamber 9 through a passage-way 12, having a diameter less than the diameter of the passageway 10. The plunger 2 controls the fluid communication between the inlet port 13 and outlet port 14. The inlet port 13 has connected thereto, a conduit 15 which leads to a four-way valve 16.

Also connected with the four-way valve 16 are conduits 17, 18 and 19 of which the conduit 17 is an exhaust conduit and may be connected to a fluid reservoir or tank 20. The conduit 19 leads to the upper portion of a cylinder 21 having reciprocably mounted therein the plunger 22. The conduit 18 leads to the lower portion of the cylinder 21.

The tank 20 is connected through a conduit 23 with the suction side of a fluid pressure source 24 such as a pump, the pressure side of which is connected through a conduit 25 with the conduit 15.

Also connected with the tank 20 is a conduit 26 leading to the outlet port 14 in the valve casing 1. The tank 20 has furthermore connected thereto a conduit 27 leading to a port 28 in an auxiliary valve, generally designated 29. The port 28 is controlled by an auxiliary plunger 30 which, in the position shown in the drawing, prevents fluid connection between the port 28 and a passageway 31 and also between the port 28 and bore 32. The bore 32 is provided in a connection 33 which threadedly engages a bore in the valve casing 1 and also threadedly engages a bore 35 in the auxiliary valve 29.

When the auxiliary plunger 30 is in its retracted position it establishes fluid connection between the bore 32 and the port 28 and also between the passageway 31 and the port 28. The passageway 31 leads into a bore 34 which is threadedly engaged by an auxiliary spring chamber 36, housing a spring 37. The left side of the spring 37 engages the adjacent portion of the auxiliary spring chamber 36 while the opposite end of the spring 37 engages a plate or washer 38. The plate 38 engages the head 39 of the plunger 30 and due to the spring 37 urges the plunger 30 continuously to the right. The thrust of the springs 7 and 37 may be adjusted by adjusting the spring chamber 4 and auxiliary spring chamber 36, respectively.

Operation

The action of the relief valve according to the present invention will appear best from a brief description of the operation of the relief valve in connection with the hydraulic circuit shown in the drawing. It may be assumed that all parts occupy the position shown in the drawing while the four-way valve 16, which may be of any standard type, occupies a neutral position in which fluid connection between conduits 15, 17, 18 and 19 is interrupted. If it is now desired to carry out a downward stroke of the plunger 22, the operator shifts the four-way valve 16 into position for establishing fluid connection between the conduits 15 and 19 while simultaneously placing the conduits 18 and 17 in fluid communication with each other.

Then, as soon as the operator starts the pump 24, pressure fluid delivered by the pump, passes through conduits 15, four-way valve 16 and conduit 19, into the upper portion of the cylinder 21 where it acts upon the plunger 22 so as to move the same downwardly. Fluid expelled by the plunger 22 during its downward movement, passes through conduit 18, four-way valve 16 and conduit 17 to an exhaust or to the tank 20.

The fluid pressure prevailing in the conduits 15 is also conveyed to the port 13 where it acts upon the adjacent annular area 40 of the plunger 2 and also upon the bottom area 41. Pressure fluid also passes from the port 13 through the narrow passageway 12, into the differenial chamber 9 and from here through the passageway 10 into the spring chamber 4.

It will be noticed that the plunger 2 is substantially balanced in view of the fact that the pressure acting upon the areas 40 and 41, is counteracted by the pressure acting on the differential area 42 plus the pressure acting in the spring chamber on the exterior of the extension 3. In this way, a relatively light spring 7, is sufficient to hold the plunger 2 in its closed position. The pressure prevailing in the differential chamber 9 is also conveyed through bore 32 to the plunger 30.

When the plunger 22 has reached the end of its downward stroke or encounters undue resistance the pressure in the conduit 15 and therefore, at the port 13, and, in the differential chamber 9, increases rapidly. As soon as this pressure has reached a pre-determined value for which the auxiliary valve 29 has been set, the pressure acting on the plunger 30 overcomes the spring 37 and moves the plunger toward the left, to thereby establish fluid connection between the bore 32 and the exhaust conduit 27. The fluid expelled from the bore 34 during this leftward movement of the plunger 30 passes through the passageway 31, to the port 28. As a result of this leftward movement of the plunger 30, the pressure in the differential chamber 9, is rapidly relieved, and fluid is exhausted through port 28 faster than fluid will be conveyed from the bore 11 through the narrow passage-way 12 into the differential chamber 9. Consequently, the equilibrium of the plunger 2 previously prevailing, in view of the pressure acting on the areas 40 and 41 on one hand, the pressure acting on the area 42 and extension 3, on the other hand, is disturbed permitting the pressure acting on the areas 40 and 41 of the plunger 2 to lift the same almost instantaneously, thereby establishing fluid connection between the inlet port 13 and outlet port 14, so that fluid pressure prevailing in the conduit 15 is released through the conduit 26. While the extension 3 moves into the spring chamber, the fluid expelled from the spring chamber, passes through the passageway 10 into the differential chamber 9.

On the other hand, when the plunger 2 returns to its closed position, fluid passes from the differential chamber 9, into the spring chamber through the passageway 10. In this way, a dash-pot effect is obtained. It has been found that the valve according to the present invention opens rapidly and does not chatter, a drawback which has been encountered with most relief valves heretofore known. As soon as the pressure in the conduit 15 drops again, the balance of the plunger 2, is substantially restored and the spring 7 returns the plunger 2 to its closing position. Also, the pressure drop in the differential chamber 9 and bore 32, allows the spring 37 to move the plunger 30 back into its closed position shown in the drawing. All parts of the relief valve now again occupy the position shown in the drawing.

By shifting the valve 16 so as to establish fluid connection between the conduits 15 and 18, while connecting the conduits 19 and 17 with each other, the pressure fluid delivered by the pump 24 will bring about a retraction stroke of the plunger 22. It will be obvious, that, during this retraction stroke, should undue pressure develop in the conduit 15, the relief valve will again operate, in the manner described above, to relieve the system of this undue pressure.

It is, of course, understood that the present invention is not limited to the particular structure shown in the drawing but also embraces all modifications which come within the scope of the appended claims.

Having thus fully described my invention, what I claim as new and desire to secure by Letters Patent, is:

1. In combination in a valve having a cylindrical bore, a cylindrical valve plunger reciprocable in said bore and controlling fluid connection between an inlet port and an outlet port, said valve plunger having an effective large area adjacent said inlet port and an opposed smaller area hydraulically connected to said larger area by a restricted passageway in said plunger, a closed casing connected to said valve, an extension member connected to said plunger and extending into said casing, yielding means continuously acting upon said extension member to urge said plunger into position for preventing fluid connection between said ports, restricted conduit means for continuously establishing a restricted fluid communication between said casing and said smaller area, and pilot relief valve means responsive to a predetermined pressure acting thereupon for establishing fluid connection between said smaller area and an exhaust.

2. In combination in a valve having an inlet port and an outlet port, a valve member having opposed differential areas and operable for selectively preventing or establishing fluid communication between said ports, a closed casing connected to said valve, an extension member connected to said plunger and extending into said casing, yielding means in said casing arranged to continuously act upon said extension member to urge said valve member into position for preventing fluid communication between said ports, restricted fluid connection for continuously establishing fluid communication between said casing and said differential areas, and pilot relief valve means responsive to a predetermined pressure acting on one of said differential areas for establishing fluid connection between said last-mentioned area and an exhaust.

3. In combination in a valve having an inlet port and an outlet port, plunger means reciprocable in said valve and having a large area adjacent said inlet port and an opposed smaller area, said areas being continuously hydraulically interconnected through a restricted passageway in said plunger means, an extension connected to said plunger means, and extending into a closed spring chamber, spring means in said spring chamber for acting on said extension to continuously urge said plunger means into a first position for preventing fluid connection between said ports, a restricted passageway having a section larger than the section of said first-mentioned passageway for continuously establishing fluid connection between said spring chamber and said smaller area, and pilot relief valve means responsive to a predetermined pressure acting on said smaller area for connecting said area to an exhaust to thereby bring about movement of said plunger into position for establishing fluid communication between said ports.

WALTER ERNST.